United States Patent [19]

Behm et al.

[11] Patent Number: 4,955,492

[45] Date of Patent: Sep. 11, 1990

[54] PLASTIC BOTTLE WITH REINFORCING RING ENCIRCLING THE BOTTLE BASE

[75] Inventors: Dale H. Behm, Ann Arbor; Theodore F. Eberle, Saline; Thomas F. Powers, Ypsilanti, all of Mich.

[73] Assignee: Hoover Universal, Inc., Ann Arbor, Mich.

[21] Appl. No.: 353,003

[22] Filed: May 17, 1989

[51] Int. Cl.$^5$ .......................... B65D 1/02; B65D 25/24
[52] U.S. Cl. ..................... 215/12.1; 215/1 C; 215/100 R; 220/69
[58] Field of Search .................. 215/1 C, 12.1, 100 R; 220/66, 69, 70

[56] References Cited

U.S. PATENT DOCUMENTS

| 2,837,245 | 6/1958 | Grebowiec | 215/1 C |
| 3,722,725 | 3/1973 | Khetani et al. | 220/69 |
| 4,127,207 | 11/1978 | Hubert et al. | 215/1 C |
| 4,573,597 | 3/1986 | Adams et al. | 220/69 X |

FOREIGN PATENT DOCUMENTS

| 2159805 | 6/1972 | Fed. Rep. of Germany | 215/100 R |
| 2510457 | 10/1975 | Fed. Rep. of Germany | 215/1 C |
| 497177 | 8/1954 | Italy | 215/12.1 |
| 697360 | 11/1965 | Italy | 215/12.1 |
| 1175048 | 12/1969 | United Kingdom | 215/1 C |

Primary Examiner—Sue A. Weaver
Attorney, Agent, or Firm—Harness, Dickey & Pierce

[57] ABSTRACT

A plastic container comprising a blow-molded plastic bottle with a reinforcing ring encircling the bottle base to reinforce the base against undesirable deformation. The ring encircles the lower end of the bottle base. Pressure within the container expands the base structure outwardly against the ring and creates tension in the ring to maintain the ring in assembly relation with the bottle base in which the ring reinforces the base and acts to maintain the structural integrity of the base. The container is manufactured by inserting the ring into the base portion of the blow-mold such that the ring defines a portion of the blow-mold cavity. A plastic preform is blow-molded outward, into engagement with the ring to secure the ring to the base.

13 Claims, 2 Drawing Sheets

PLASTIC BOTTLE WITH REINFORCING RING ENCIRCLING THE BOTTLE BASE

BACKGROUND OF THE INVENTION

The present invention relates to plastic containers and in particularly to plastic containers which have a reinforcing ring in the base to strengthen the base against undesirable deformation.

In recent years, the use of plastic containers for beverages, and particularly carbonated beverages has increased dramatically. These containers are typically blow molded from an injection molded polyethylene terephthalate (PET) preform. A difficulty, however, with use of plastic containers for carbonated beverages is in providing sufficient strength in the container base to resist deformation. The internal pressure in a container filled with a carbonated beverage can range from approximately 60 psig at room temperature to as high as 100 psig at 100° F. These pressures can produce deformation in a plastic container at its base which can result in a container no longer having a flat bottom surface perpendicular to the upright axis of the bottle such that the bottle will no longer stand upright on a horizontal supporting surface. In addition to the stability problem of a bottle with a deformed base, when the base is deformed, the volume of the bottle typically increases. The volume increase results in a lowering of the liquid fill line such that consumers may be lead to believe that the bottle was not properly filled or sealed.

One solution to the problem of base deformation is to mold the bottle with a hemispherically shaped base extending downwardly from the sidewall of the container. The hemispherical shape, although resistant to deformation, requires a separate support stand to enable the container to stand upright. Typically, a second plastic piece, often referred to as a base cup, is glued to the hemispherical bottom of the bottle. The base cup includes a bottom wall defining a flat horizontal surface and a generally cylindrical wall extending upwardly from the bottom wall and engaging the side of the plastic bottle.

A major disadvantage with a base cup container is the additional material cost required for the base cup. Base cups are often molded of polyethylene which has dramatically increased in price. The polyethylene base cup contributes almost half of the container material cost while providing approximately one-third of the container material weight. Another difficulty with the use of PET bottles and polyethylene base cups is in recycling the plastic material of the container. Before the plastic can be recycled, the PET bottle must be separated from the polyethylene base cup.

Accordingly it is an object of this invention to provide a container which is more economical to produce than a typical base cup container in terms of both the cost of material and the quantity of material required.

It is a further object of the invention to provide a container constructed entirely of a single plastic material such that separation of the different plastic materials is not necessary before recycling the container.

The plastic container of this invention includes a blow-molded plastic bottle having a generally cylindrical sidewall with a base structure at its lower end. The base structure includes a bottom wall extending downwardly from the lower end of the sidewall. The center portion of the bottom wall is inverted upwardly into the container forming a dome in the center of the base. A base having this type of central dome is often referred to as a champagne bottle base.

A plastic reinforcing ring is attached to the bottom wall around the outer side of the bottle adjacent the lower end of the bottle. The plastic ring is positioned on the outer side of the bottle such that the carbonation pressure within the bottle exerts a downward force on the central dome which creates tension in the ring. This tension maintains the ring in a position on the base structure in which the ring reinforces the base structure to prevent the central dome from everting.

The reinforcing ring can be injection molded of the same plastic material used to blow-mold the bottle such that separation of the ring from the bottle is not necessary before recycling the material in the container. Alternatively, the ring can also be made of a lightweight metal such as aluminum.

The container can be manfactured by inserting the ring into the base portion of a blow-mold and blow-molding the bottle within the ring. By molding the bottle with the ring in this manner, an assembly process step to attach the ring to the base structure is not required. The manufacturing process of the container of this invention is thus simplified over that used for manufacturing a base cup container.

The reinforcing ring can be configured such that it extends downwardly below the lowermost portion of the bottle to form a lowermost planar surface for supporting the container upright on a horizontal surface.

Further objects, features and advantages of the invention will become apparent from a consideration of the following description and the appended claims when taken in connection with the accompanying drawings.

DETAILED DESCRIPTION OF THE INVENTION

Figure 1:
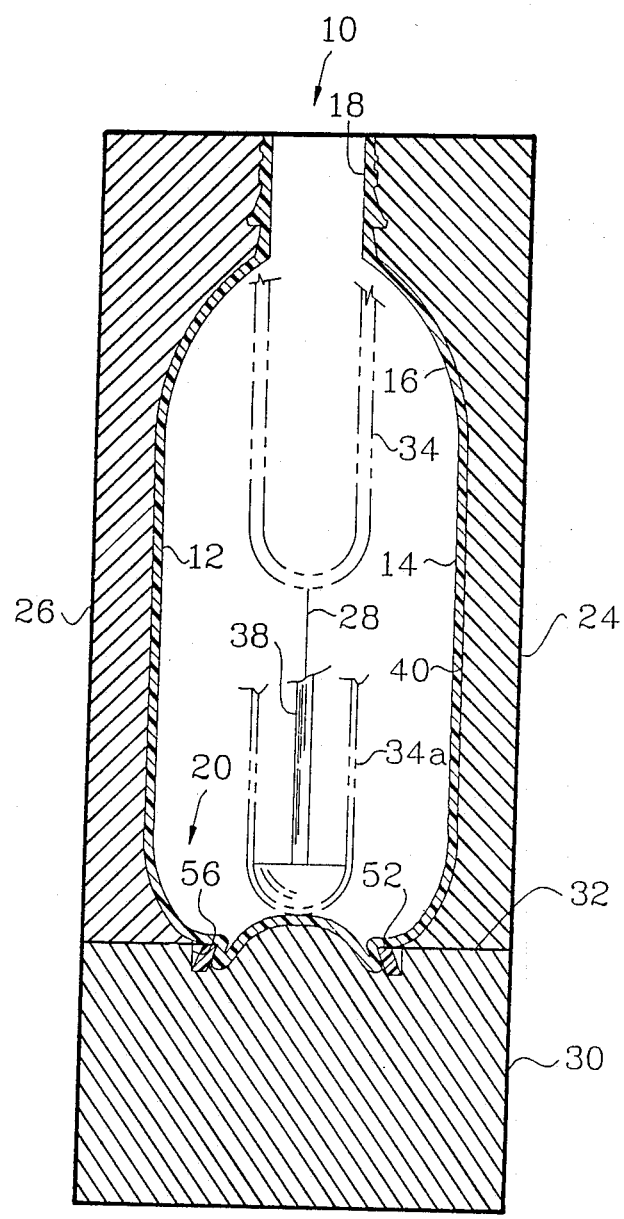
FIG. 1 is a sectional view of a blow-mold cavity for molding the container of this invention.

Container 10 of the present invention, having a reinforcing ring attached to the outer wall of the bottle base, is shown in FIG. 1 in a mold used to manufacture the container. Container 10 includes a blow-molded plastic bottle 12 having an upright tubular sidewall 14 with a shoulder portion 16 at its upper end tapering into a threaded neck 18 at the top of the container. Extending downward from the lower end of the sidewall 14 is a base structure 20.

The container 10 is shown in the blow-mold cavity used to mold the bottle 12. The mold cavity is comprised of two mold halves 24 and 26 which are separable along a parting line 28. The bottom of the mold cavity is closed by a base portion 30 which separates from the mold halves 24 and 26 along a parting line 32. When the mold is closed, it defines a mold cavity having an interior surface 40.

The bottle 12 is molded by placing an injection molded plastic preform 34 in place and closing the mold halves 24 and 26 around the neck portion of the preform 34 formed of PET and shown in phantom lines in FIG. 1 at the upper portion of the mold cavity. The preform 34 which has been heated to the proper temperature for blow molding, is stretched downward to the position shown at the bottom of the mold cavity and designated as 34a. The preform is stretched by a stretch rod 38. After stretching the preform, blow air is injected into the preform to blow the plastic preform outward against the surface 40 of the mold cavity.

Figure 2:
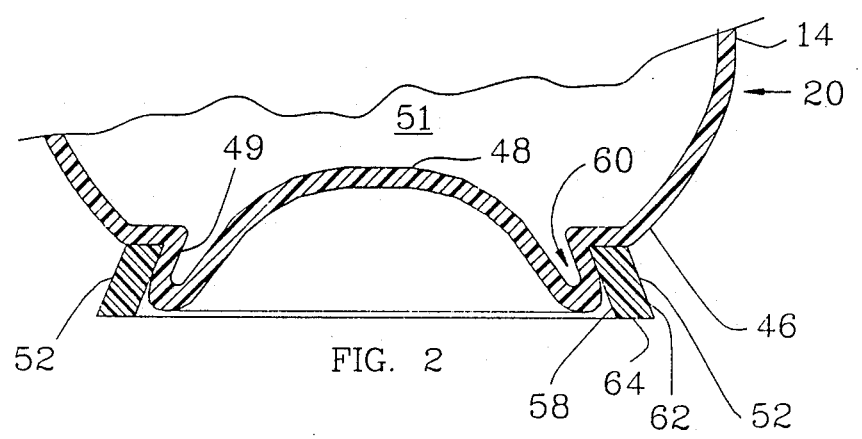
FIG. 2 is a vertical sectional view of the base portion of the container of this invention having a reinforcing ring in this base.
Figure 3:
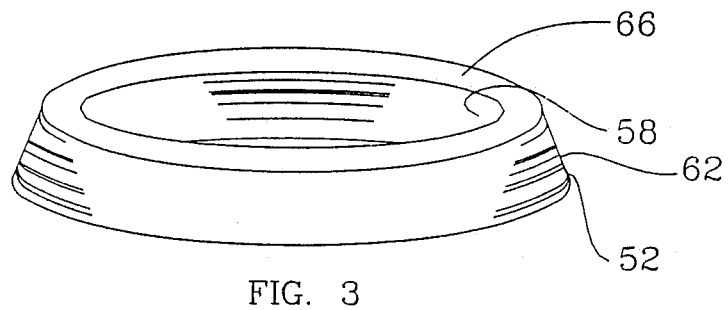
FIG. 3 is a perspective view of the reinforcing ring embodied in the container shown in FIG. 2.

The base structure 20 of the container is shown more clearly in FIG. 2. The base structure 20 includes an inner bottom wall portion 48 which is upwardly concave and which forms the central portion of the base structure, a generally upright annular shoulder 49 extends around the lower end portion of the bottom wall 48 and an upwardly and outwardly extending outer bottom wall portion 46 connects the shoulder 49 to the lower end of the sidewall 14. The bottom wall portion 48 is upwardly concave, having a concave outer surface and projects upwardly into the container forming a center dome portion. This type of base, with a center dome, is often referred to as a champagne bottle base.

A reinforcing ring 52 encircles the shoulder 49. The reinforcing ring 52 is formed of a substantially rigid material that is firm and non-stretchable when in tension, such as metal or plastic, preferably PET, the same material as bottle 12. The ring 52 has an inclined inner surface 58 which engages the shoulder 49 in surface-to-surface engagement. Friction between the ring and shoulder from the surface-to-surface engagement holds the ring onto the shoulder. Also, the configuration of the base and the shape of the ring 52 provide for a mechanical locking of the ring onto the shoulder 49 which at its upper end, the ring 52 engages the bottom wall portion 46 to stabilize its position on the shoulder 49. The inner surface 58 of the ring is frusto-conical in shape as is the shoulder 49. The ring 52 is also shown with a frust-conical outer surface 62.

The container is manufactured by placing the reinforcing ring 52 into an annular groove 56 in the mold base 30 as shown in FIG. 1. The inclined inner surface 58 and the top surface 66 of the reinforcing ring define a portion of the blow-mold surface. The preform 34a is blow molded outward, into engagement with the ring inner surface 58 and top surface 66, thus forming the shoulder 49.

The container 10 forms a main chamber 51 for carbonated liquid. The base structure is configured so as to form an annular secondary chamber 60 which is below the main chamber 51 and in fluid communication with the main chamber.

The reinforcing ring 52 is positioned radially outwardly of the bottom wall 48 so that the pressure of carbonated beverage in the container, exerting a downwardly directed force on the bottom wall, creates tension in the ring. This maintains the ring in a position on the base structure in which the ring 52 reinforces the base structure and acts to prevent the bottom wall from everting.

The ring 52 includes a planar bottom surface 64 which, when the ring is attached to the container, is positioned below the container, forming a support surface upon which the container 10 is supported upright.

The ring 52 is configured and assembled with the bottle base so as to utilize the forces resulting from pressure of the carbonated liquid contents of the bottle to maintain the ring in an assembly relation with the bottle in which the ring reinforces the base and acts to maintain the structural integrity of the base. The downward acting forces on the bottom wall 48 forces the bottom wall radially outward, such that the base structure creates tension in the ring 52, holding the ring securely to the bottom base structure. The ring 52 resists radial expansion of the bottom wall necessary for the bottom wall to evert.

The container is manufactured in a one-step process of blow molding the bottle with the reinforcing ring in place in the mold to encircle the bottle. This results in a container which is less costly to produce than a base cup container while providing a base which resists undesirable deformation.

It is to understood that the invention is not limited to the exact construction or method illustrated and described above, but that various changes and modifications may be made without departing from the spirit and scope of the invention as defined in the following claims.

What is claimed:

1. A plastic container for carbonated beverages comprising:
   a tubular body having an upright sidewall and a base structure extending downwardly from said sidewall so as to close the lower end of said tubular body, said base structure including an upwardly concave bottom wall at the center of said base structure, a shoulder extending generally upwardly from the periphery of said concave bottom wall and an outer wall extending upwardly and outwardly from said shoulder to connect said shoulder to said sidewall; and
   an annular reinforcing ring extending about said shoulder and being of a size to engage said shoulder, carbonation pressure in said container exerting a downward force on said concave bottom wall forcing said shoulder radially outwardly against ring to secure said ring on said shoulder, said outward force creating tension in said ring and said ring being of a rigid material whereby said ring resists said outward force preventing eversion of said concave bottom wall.

2. The container of claim 1 wherein said reinforcing ring terminates in a lower planar surface extending below said base structure to form a surface upon which said container is supported in an upright manner.

3. The container of claim 1 wherein said reinforcing ring has a radially inner surface, at least a portion of said inner surface being in closely fitting surface-to-surface engagement with said shoulder so as to frictionally retain said ring on said base structure prior to filling of said container with a carbonated beverage.

4. The container of claim 3 wherein said ring inner surface and said shoulder are inclined inwardly and upwardly so as to be frusto-conical in shape.

5. The container of claim 4 wherein the upper end of said ring engages said upwardly and outwardly extending outer wall.

6. A plastic container for carbonated beverages comprising:
   a tubular body haivng an upright sidewall and a base structure extending downwardly and inwardly from said sidewall so as to close the lower end of said tubular body, said tubular body forming a main chamber for containing said carbonated beverages, said base structure having an upwardly concave bottom wall at the center of said base structure, said base structure including a generally upright shoulder at the periphery of said concave bottom wall forming an annular secondary chamber for said carbonated beverage below said main chamber, said secondary chamber being in fluid communication with said main chamber and said base structure including an outer wall extending from said shoulder to said sidewall to close the lower end of said tubular body; and an annular reinforcing ring extending about said shoulder and being of a size to engage said shoulder radially outwardly of said annular secondary chamber, the pressure of carbonated beverage in said container forcing said shoulder radially outwardly into firm engagement with said reinforcing ring thereby maintaining said ring in position on said base structure, said ring being rigid so as to resist outward movement of said shoulder to prevent eversion of said concave bottom wall.

7. The container of claim 6 wherein said reinforcing ring terminates in a lower planar surface extending below said base structure to form a surface upon which said container is supported in an upright manner.

8. The container of claim 6 wherein said reinforcing ring has a radially inner surface, a least a portion of said inner surface being in closely fitting surface-to-surface engagement with said base structure so as to retain said ring on said base structure prior to filling said container with a carbonated beverage.

9. The container of claim 8 wherein said ring inner surface and said shoulder are inclined inwardly and upwardly so as to be frusto-conical in shape.

10. A plastic container for carbonated beverages comprising:

a tubular body having an upright sidewall and a base structure extending downwardly from said sidewall so as to close the lower end of said tubular body, said base structure having an upwardly concave bottom wall at the center of said base structure and an annular outer wall connected to the lower end of the said tubular body and merging with the periphery of said concave bottom wall forming a heel portion, said outer wall forming a generally upright shoulder adjacent said heel portion; and an annular reinforcing ring encircling said heel portion and engaging said shoulder adjacent said heel portion so that the pressure of the carbonated beverage in said container exerting a downwardly directed force on said bottom wall creates tension in said ring to maintain said ring in a position on said base structure as said heel portion and shoulder are deflected outwardly by said force whereby said ring reinforces the base structure and acts to prevent said bottom wall from everting.

11. The container of claim 10 wherein said reinforcing ring terminates in a lower planar surface extending below said base structure to form a surface upon which said container is supported in an upright manner.

12. The container of claim 10 wherein said reinforcing ring has a radially inner surface, at least a portion of said inner surface being closely fitting surface-to-surface engagement with said shoulder so as to frictionally retain said ring on base structure.

13. The container of claim 12 wherein said ring inner surface is frusto-conical.

* * * * *

UNITED STATES PATENT AND TRADEMARK OFFICE
CERTIFICATE OF CORRECTION

PATENT NO. : 4,955,492
DATED : September 11, 1990
INVENTOR(S) : Dale H. Behm et al It is certified that error appears in the above-identified patent and that said Letters Patent is hereby corrected as shown below:

Column 4, Line 35, Claim 1, after "against", insert --said--.

Signed and Sealed this

Seventh Day of January, 1992

Attest:

HARRY F. MANBECK, JR.

*Attesting Officer*      *Commissioner of Patents and Trademarks*